UNITED STATES PATENT OFFICE.

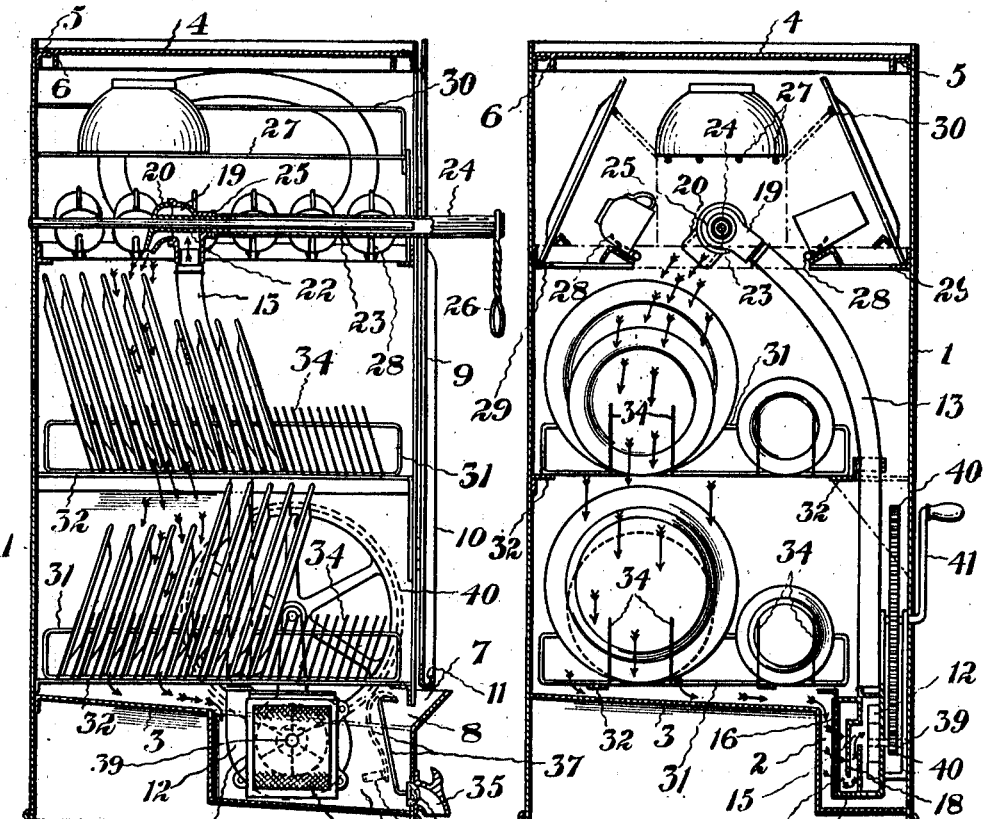

HOWARD ADDISON JOHNSTON, OF TORONTO, ONTARIO, CANADA.

DISH-WASHING MACHINE.

993,602.  Specification of Letters Patent.  Patented May 30, 1911.

Application filed March 15, 1910. Serial No. 549,453.

*To all whom it may concern:*

Be it known that I, HOWARD ADDISON JOHNSTON, of the city of Toronto, in the Province of Ontario, Canada, have invented certain new and useful Improvements in Dish-Washing Machines, of which the following is a specification.

This invention relates to apparatus for use in washing household dishes, and my object is to devise apparatus of this character in which dishes may be placed as removed from the table, washed, rinsed, dried by evaporation, and allowed to remain till next needed.

I attain my object by a construction which may be briefly described as follows:—A rectangular casing is provided with a door at one side and a movable lid. In the bottom of the casing is provided a well from which water is pumped by means of a suitable pump and discharged through a nozzle adapted to be moved back and forth in a straight line and rotated in a plane at right angles to said line. At the top of the casing is formed a rack to receive bowls, vegetable dishes and the like. At each side below the rack is located a cup rail provided with spring clips adapted to grip the rims of cups, glasses and the like. Below the cup rails one or more sets of guide ways are provided to receive a like number of plate-receiving trays which are provided with a plurality of wire fingers forming plate holders.

My invention consists, essentially, in certain features of the construction hereinafter more specifically described and then definitely claimed.

Figure 1, is a vertical section of my machine taken from back to front. Fig. 2, is a vertical section taken transversely of the machine. Fig. 3, is a plan view with the cover removed. Fig. 4, is a sectional detail of the discharge nozzle. Fig. 5, is a perspective detail of a portion of one of the series of plate holders. Fig. 6 is a view in side elevation partly in section, showing the drain outlet with its closure and operating means.

In the drawings, like figures of reference indicate corresponding parts in the different figures.

1, is the casing of the machine which is of suitable size to accommodate the desired
number of dishes and constructed in a suit-
able manner. In the bottom of the casing is formed a pump well 2, which preferably occupies only a portion of the bottom of the casing, the remaining portion 3, of the bottom of the casing being inclined toward the pump well to discharge the drainage into the well. The top of the casing is provided with a removable cover 4, which is adapted to rest on ledges 5, formed in any suitable manner adjacent to the upper edges of the casing. The lid itself is provided with depending flanges 6, fitting inside the inner edges of the ledges. By this arrangement I secure an easily removable lid water tight under the conditions obtaining in the dish washer.

An opening is provided in the front of the casing adapted to be closed by a suitable door which may be either double or single but is preferably double as shown. The opening extends down to a point above the bottom of the well and below the lower edge of the opening is formed the external water trough 7, communicating by means of the opening 8, with the pump well. The doors 9, are hinged to the casing and overlap where they meet. Adjacent to their vertical edges the doors are provided with the inwardly projecting flanges 10, which prevent the water splashing through.

As the water used in the machine will run down the doors, I provide each door with a drip trough 11, which is suitably inclined so that it will discharge into the water trough whether the door be open or closed. The constructions rendering the device water tight under the conditions of use are naturally of importance, as splashing of water over the floor is undesirable.

Within the casing in the pump well is located a suitable pump 12, preferably a centrifugal pump, as shown. The pump spindle 39, is driven by a train of gearing 40, from the crank arm 41. This pump discharges through the tube 13, which must be made flexible in order that the discharge nozzle may be moved to various positions.

The inlet to the pump is through a box 14, communicating through the opening 15, with the pump casing. The outer side of the box is provided with a screen 16, sliding in suitable guides 17, formed on the box. A partition 18, is formed in the box to prevent the passage of air into the pump when the water level in the well falls below the central opening in the pump, the water passing through under the partition as indicated by the arrows.

The flexible discharge tube is preferably formed of a light piece of hose constructed on the principle of ordinary suction hose. The upper end of this tube 13, is connected with a chamber 19. On this chamber is rotatably mounted a discharge nozzle 20, in such a manner that the nozzle may be rotated to discharge the water in various directions in a plane substantially at right angles to the axis on which it rotates. As a convenient construction the discharge nozzle fits an annular seat 21, formed at the rear side of the chamber 19.

A sleeve 22, is formed on the nozzle and extends through a hole in the front of the chamber. This sleeve 22, is adapted to slide on the rod 23, fixed to the rear of the casing. At the point where the sleeve 22, passes out of the chamber, a hollow operating rod 24, is secured to the sleeve and is preferably provided with the collar 25, fitting close to the chamber and serving to retain the discharge nozzle in position. The hollow operating rod extends out through notches formed in the doors at their overlapping edges and is provided with a handle 26. By means of this handle it will be seen the discharge nozzle may be given an axial movement on the rod 23, and also rotated above said axis to direct its discharge in different directions.

In order that the dishes may be suitably placed to be acted on by the water discharged from the nozzle, I provide the following arrangements. Centrally at the upper end of the casing I provide a rack 27, on which bowls, vegetable dishes and the like may be placed. Below this rack are located the cup racks, one on each side of the discharge nozzle. Each rack comprises a bar to which are secured the spring fingers 28, which grip the rims of the cups or glasses, as shown. These racks are so arranged that the cups are self-drained. Behind the cup racks are located the racks for the platters. These are each formed of a ledge 29, on which the lower edges of the platters may rest, and a bar 30, against which they may lean, as shown, with an inclination toward the discharge nozzle. Below the nozzle are located the trays 31, for plates, saucers and the like. These trays rest on the ledges 32, so that they may be removed when necessary. Each of these trays is provided with holders for plates. While various constructions might be employed, I prefer to use the form of holder particularly illustrated in Fig. 5. It will be seen that a series of wire links 33, are formed looped together and provided with fingers 34. These will be bent in each series to different angles to suit different angles of the rims of different kinds of plates, saucers and soup plates requiring greater inclination than dinner and tea plates. The trays are placed in the machine so that the plates will be inclined in different directions, as indicated in Fig. 1, their placing thus resembling that of the vanes of an elastic fluid turbine.

The pump well is drained through an outlet at its bottom, preferably provided with the spout 35. As the machine must be cheaply constructed, the use of an ordinary expensive cock is inadmissible, and I have, therefore, devised a cheap and effective closure especially adapted for the purpose. A plug 36, is adapted to seat itself in the opening from the inside. A wire arm 37, having a certain amount of resiliency is connected to the plug, extended upward above the water level in the well and carried out through the side of the casing where it is turned again in a plane parallel to the surface of the casing, so that by rocking the outside portion of the arm the plug may be moved into or out of the opening. The outside of the casing is provided with lugs 38, over which the end of the arm may be sprung to hold the plug in either of the positions indicated.

The device is used as follows: The dishes are placed in position as shown, sufficient boiling water poured in, and the pump rotated at the same time the discharge nozzle is moved back and forth and oscillated from side to side to direct the stream of water in succession against the various racks of dishes, the preferable order being to first operate on the articles on the bowl rack, then the articles on the cup and platter racks and finally on the plates and other dishes in the plate trays. After washing, the dirty water is discharged and fresh hot rinsing water introduced. The machine may then be opened up and the dishes allowed to dry.

What I claim as my invention is:—

1. In a dish washing machine provided with a casing and a pump adapted to discharge water through a suitable flexible tube, the combination therewith of a nozzle; and a guide within the casing on which the nozzle is suitably supported to be moved back and forth and rotatably moved to direct a stream of water in various directions.

2. In a dish washing machine the combination of a casing; a pump for drawing water; a flexible tube into which the pump discharges; and discharge directing means comprising, a chamber connected to the tube, and a nozzle rotatably connected to said chamber; a guide on which the discharge means are longitudinally movable, and a handle whereby the discharge directing means may be reciprocated on said guide and the said nozzle rotated.

3. In a dish washing machine, the combination of a casing having a pump-well formed at its bottom; a pump for drawing water from said well; a tube into which the pump discharges; and a discharge nozzle connected with said tube; and a guide within the casing on which the nozzle is adapted to be moved back and forth and turned in a plane at right angles to said direction of motion to discharge water in different directions.

Dated at Toronto this 11th day of March 1910.

HOWARD ADDISON JOHNSTON.

Signed in the presence of—
ANNIE CAMPBELL,
J. EDW. MAYBEE.